(12) United States Patent
Misiak

(10) Patent No.: US 6,977,278 B1
(45) Date of Patent: Dec. 20, 2005

(54) CYANOACRYLATE COMPOSITIONS CURABLE TO FLEXIBLE POLYMERIC MATERIALS

(75) Inventor: Hanns Roland Misiak, Dublin (IE)

(73) Assignee: Loctite (R&D) Ltd., Dublin (IE)

( * ) Notice: Subject to any disclaimer, the term of this patent is extended or adjusted under 35 U.S.C. 154(b) by 85 days.

(21) Appl. No.: 10/023,950

(22) Filed: Dec. 21, 2001

(30) Foreign Application Priority Data

Jan. 8, 2001 (EP) .................................. 01650001

(51) Int. Cl.$^7$ .................... C08F 5/10; C08F 222/32; B05D 3/02; B32B 27/22
(52) U.S. Cl. ..................... 524/315; 524/317; 523/111; 526/298; 427/385.5; 428/500
(58) Field of Search ............................. 524/315, 317; 523/111; 526/298; 427/385.5; 428/500

(56) References Cited

U.S. PATENT DOCUMENTS

| | | | |
|---|---|---|---|
| 2,776,232 A | 1/1957 | Shearer, Jr. et al. | 154/46 |
| 2,784,127 A | 3/1957 | Joyner et al. | 154/43 |
| 2,784,215 A | 3/1957 | Joyner et al. | 260/465.4 |
| 3,699,127 A | 10/1972 | O'Sullivan et al. | 260/33.2 |
| 3,961,966 A | 6/1976 | Brinkmann et al. | 106/36 |
| 4,364,876 A | 12/1982 | Kimura et al. | 260/465.4 |
| 4,444,933 A | 4/1984 | Columbus et al. | 524/292 |
| 5,480,935 A | 1/1996 | Greff et al. | 524/776 |
| 5,716,607 A | 2/1998 | Byram et al. | 424/78.02 |
| 5,998,472 A | 12/1999 | Berger et al. | 514/527 |
| 6,512,023 B1 * | 1/2003 | Malofsky et al. | 523/111 |
| 2002/0156203 A1 * | 10/2002 | Hickey et al. | 525/503 |
| 2003/0074049 A1 * | 4/2003 | Hoganson et al. | 623/1.13 |

FOREIGN PATENT DOCUMENTS

| | | |
|---|---|---|
| EP | 0 690 112 | 3/1996 |
| GB | 1196049 | 4/1971 |
| GB | 1529105 | 3/1976 |
| JP | 06 128 389 | 10/1994 |
| WO | WO 98/07802 | 2/1998 |
| WO | WO 99/18950 | 4/1999 |

OTHER PUBLICATIONS

G.H. Millet, "Structural Adhesives—Chemistry and Technology", Plenum Press, New York (1996).

* cited by examiner

Primary Examiner—Tae H. Yoon
(74) Attorney, Agent, or Firm—Steven C. Bauman

(57) ABSTRACT

A cyanoacrylate composition comprising (i) at least one lower cyanoacrylate monomer component selected from ethyl cyanoacrylate or methoxy ethylcyanoacrylate; (ii) at least one higher cyanoacrylate monomer component than in an amount greater than 12% by weight based on the total weight of the combination of the lower cyanoacrylate monomer and the higher cyanoacrylate monomer and (iii) a plasticizer. The higher cyanoacrylate monomer and the plasticizer are chosen from certain ones. The compositions cure to give flexible polymeric materials which are desirably also transparent.

45 Claims, No Drawings

CYANOACRYLATE COMPOSITIONS CURABLE TO FLEXIBLE POLYMERIC MATERIALS

FIELD OF THE INVENTION

This invention relates generally to the field of cyanoacrylate (CA) compositions, in particular those useful as adhesives compositions. The present invention is particularly concerned with providing cyanoacrylate compositions which cure to give flexible polymeric materials, for example compositions which when cured form a flexible bond between substrates or which can be used to seal gaps, cracks etc.

BACKGROUND TO THE INVENTION

Cyanoacrylates have been known for a long time. Their use particularly as instant adhesives has been well documented with a huge amount of research directed towards identifying cyanoacrylate compositions for specific end use applications. The use of CAs extends across the fields of mechanical, electrical, medical, automotive, consumer industries and many other fields. A very great number of applications in these fields are well known and are not described in detail here.

One observed phenomenon with cyanoacrylate formulations is that they tend to cure to form relatively brittle polymeric materials. This is an undesirable property for certain applications where a degree of flexibility in the polymeric material is desired. Such applications include bonding flexible materials where a degree of flexibility in the bond to match the flexibility of the material is desired. Such flexible materials include textile materials, flexible plastics, elastomeric materials, films, and other flexible materials such as rubber. It is also desirable to have a flexible polymeric material in applications where the polymeric material may be subjected to varying forces in its end-use application. For example if the polymeric material has bonded together two substrates, the substrates may not remain in an undisturbed condition but may be subject to external forces, for example where the substrates form part of a moving object, or part of a stationary object which is subjected to one or more continuous or occasional forces from other moving objects. It is desirable that cyanoacrylate compositions could be used to form flexible polymeric materials of any desired shape or for any desired use such as in coating, producing films, layers etc.

Accordingly much effort has been directed to providing cyanoacrylate formulations which cure to form a flexible polymeric material. One of the approaches to overcoming the brittleness of polymerised cyanoacrylate adhesives has been to plasticise the composition. In the literature a distinction has been made between internal and external plasticisation. Internal plasticisation in a cyanoacrylate polymer has been described as being obtainable by the use of monomer mixtures. The use of mixtures of cyanoacrylate monomers is thought to result in a more flexible polymeric material when the monomer mixture is cured. Indeed one review by G. H. Millet entitled "Structural Adhesives Chemistry and Technology", Plenum Press, New York (1996) adopts this internal and external plasticisation terminology and reports certain manufacturers selling mixed monomer adhesives for elastomer or plastic bonding. A second approach has been to incorporate what are termed as "external plasticisers" in cyanoacrylate compositions. External plasticisation is achieved by incorporating in the cyanoacrylate composition a component which imparts the desired flexibility to the polymerised material. The flexibility is generally described as being achieved as a compromise as deleterious effects to other desirable properties such as slower cure speeds, lower bond strength and often opacity of cured material may result due to the presence of external plasticiser.

Many external plasticisers show only an initial effect so that when the composition is first polymerised the polymeric material formed is relatively flexible. With many plasticisers however ageing of the polymeric material (often a bond) reveals that the flexibility initially imparted to the material by incorporation of the plasticiser is lost as time passes. Accordingly with many of the known plasticisers the polymeric material becomes brittle over a relatively short period, for example a number of weeks, and the initial desired flexibility is lost. Furthermore it has been noted that using internal plasticisation may suffer from the same drawback.

An alternative approach to overcoming the flexibility deficiency in the polymerised material has been to develop high molecular weight cyanoacrylate monomers. These polymers are thought to polymerise to form polymers which exhibit greater internal flexibility. Such monomers however are relatively expensive to manufacture and have not generally received wide-spread acceptance for large scale applications.

U.S. Pat. No. 2,776,232 (Shearer and Coover) refers to overcoming the identified problem of brittleness in polymeric materials prepared from cyanoacrylate monomer mixtures of at least two different α-cyanoacrylates. The mixed cyanoacrylate monomer compositions are described as being formed by individually de-polymerising the desired monomer from its polymer or de-polymerising a mixed polymer to give a mixed monomer. The '232 patent describes including a plasticiser such as tricresyl phosphate to give a low melting and readily depolymerised polymer so as to allow ease of obtenation of the monomer(s). Other uses of plasticiser are not mentioned. The '232 regards that the mixture of the polymers in the composition result in adhesive bonds which are considerably more flexible after polymerization than are the bonds of homopolymers of α-CAs. No data is supplied to support the assertion of increased flexibility in the polymeric bond or the polymer itself. It is not believed that the compositions proposed in the '232 patent sufficiently solve the brittleness problem associated with the polymerised cyanoacrylate material to allow compositions exhibiting desired properties to be made reliably. In particular it is thought that any flexiblisation achieved will not be maintained over time.

U.S. Pat. No. 2,784,215 (Joyner) refers to compositions including alkoxy alkyl or thioalkoxyalkyl esters of α-cyanoacrylic acid. The monomers proposed by the '215 patent are also suggested as being miscible with alkyl α-cyanoacrylates such as methyl α-cyanoacrylate to give compositions which form high strength bonds with alleged excellent ageing properties and flexibility characteristics which are desired as being better than those demonstrated by the alkyl α-cyanoacrylate bonds and not as good as those properties exhibited by the monomers which are the subject of the '215 patent.

U.S. Pat. No. 4,364,876 (Kimura et al) is directed to, what was at the time, a novel 2-cyanoacrylate monomer. The '876 patent also refers to the use of the monomers provided with more conventional 2-cyanoacrylate monomers. The '876 patent refers generally to the addition of a plasticiser which may result in a flexible cured product. This flexible cured product is described as being obtainable by adding dioctyl phthalate, dibutyl phthalate, trioctyl trimellitate, dioctyl adipate, dioctyl glutarate in an amount of 0–50% by weight based on the weight of the 2-cyanoacrylate.

U.S. Pat. No. 2,784,127 (Joyner and Coover) is directed to the problem of overcoming brittleness found in the polymer of cyanoacrylate monomers. The '127 patent is particularly directed to addressing the problem of objectionable bond failure after ageing. The patent refers to adhesive compositions composed of monomeric α-cyanoacrylate esters and refers to the possibility of mixtures of the monomeric α-cyanoacrylate esters being used. The patent refers to using ester plasticisers of defined types in an amount from 1–20% by weight and in particular from about 1–5% by weight.

While Millet refers to internal and external plasticisation, the '127 patent makes no distinction between internal and external plasticisation. The provision of a small amount of butyl cyanoacetate to flexibilise the polymeric material is employed in Examples 3, 4 and 8 in addition to the cyanoacrylate monomer component. Examples 5–7 and 9–11 are directed to the use of a monomeric cyanoacrylate together with an external plasticiser. The '127 patent does not supply any quantitative data to support the contention that a more flexible bond is achieved. It is not believed that the '127 patent teaches how to reliably formulate a cyanoacrylate composition which yields a polymeric material which demonstrates the type of flexibility described in the opening passage of the '127 patent as being desirable when polymerised, and indeed after a period of ageing of at least a few weeks.

U.S. Pat. No. 3,699,127 (O'Sullivan et al) is directed to novel plasticisers which are organic ethers, in particular aryl or diaryl ethers, where the aromatic ring of each aryl group is directly bonded to the ethereal oxygen. The plasticisers are referred to as useful in a range of between 0.2% and 15% by weight of the adhesive composition. The desired range is between 05% and about 10% by weight. The '127 patent states that above about 15% by weight the presence of the plasticisers can affect adversely the strength of the cured bond.

Further description of plasticisers compositions can be found in UK Patent No. 1 529 105. The UK '105 patent is directed to the problem of providing an adhesive formulation which combines the rapid bonding associated with cyanoacrylate with reduced and controlled bond strength along with the ability to be readily debonded when desired. The composition proposed in the UK '105 patent is an adhesive composition having at least one polymerisable ester of an α-cyanoacrylate acid, from 20% to 60% by weight of the composition of a plasticiser which is miscible with the ester and from 0.015% to 0.15% by weight of the composition of a carboxylic acid which is soluble in the ester. While mention of mixtures of monomeric α-cyanoacrylate esters is made, it is concluded that preferably a single ester is used. The preferred range for the plasticiser is 30% to 40% by weight.

U.S. Pat. No. 3,961,966 (Brinkmann et al) relates to cyanoacrylate compositions comprising plasticisers which are monocyclic or bicyclic lactones having from 3 to 20 carbon atoms and having from 4 to 7 members in the lactone ring.

A further cyanoacrylate-based adhesive composition which is described as having reduced adhesion to the skin is described in U.S. Pat. No. 4,444,933 (Columbus et al). The composition contains a 2-cyanoacrylate ester, a vinyl chloride/vinyl acetate copolymer and optionally plasticiser. A similar disclosure appears in UK Patent No. 2 268 503 B which again relates to cyanoacrylate adhesive compositions having reduced adhesion to the skin. The composition includes a 2-cyanoacrylate, an anionic polymerization accelerator which is least one of an aliphatic alcohol and various aliphatic carboxylic acid esters.

U.S. Pat. No. 5,716,607 (Byram et al) discloses a method for inhibition of late radiation induced skin damage during treatment with ionising radiation. The '607 patent is concerned with the provision of a biocompatible polymeric layer over the surface of the skin to be exposed to the radiation. Cyanoacrylates are preferred monomers for formation of the polymeric layer with n-butyl cyanoacrylate being the preferred and only exemplified monomeric material employed. Addition of a biocompatible plasticiser is also disclosed.

WO 99/18950 discloses mixed alkyl cyanoacrylate compositions which are for topical application onto intact or broken skin and which exhibit sufficient flexibility on curing to allow the integrity of the polymerised material to remain while bonded to the skin. The document describes in general the desirability of non-inclusion of plasticisers to impart the desired flexibility, and aims instead to provide a mixture of CA esters which when polymerised form a polymeric material with the desired flexibility characteristics. In particular the document refers to the addition of a sufficient amount of a $C_{10}$–$C_{12}$ alkyl cyanoacrylate ester to a $C_1$–$C_8$ alkyl cyanoacrylate ester so as to form a flexible CA polymer on mammalian skin without the need for a plasticiser. While the document describes the desirability to avoid the addition of plasticisers a number of biocompatible plasticisers are referenced. Exemplified are compositions containing n-butyl and n-decyl cyanoacrylate. Plasticiser (dioctylphthalate) is used in a composition together with n-butyl cyanoacrylate as a comparative formulation. Referenced in WO 99/18950 is U.S. Pat. No. 5,480,935 (Greff et al) which describes cyanoacrylate compositions comprising at least one $C_4$–$C_{10}$ alkyl cyanoacrylate, a biocompatible plasticiser and $SO_2$ as a polymerisation inhibitor for application to the skin. Examples of biocompatible plasticiser are given.

While many broad disclosures relating to the potential use of two or more cyanoacrylate esters to "internally" flexibilise the resultant polymeric material when the monomer mixture is polymerised and attempts have been made to provide "external plasticisers" which can suitably flexibilise the resistant polymeric material, no specific proposal has been taught or suggested which would identify adhesive compositions which more regularly and more reliably achieve the desired result. Accordingly it is desirable to provide an adhesive composition based on a cyanoacrylate which may be cured to a polymeric material which demonstrates a desired flexibility.

A further desirable result not addressed to any great extent in those documents discussed above is a clear polymerised material. Many end users have a preference for a cyanoacrylate composition which is clear (transparent) and colourless and also prefer to find that the resultant polymeric material is clear (transparent) and colourless also. This is particularly desirable if transparent materials are to be bonded. It is also desirable where excess adhesive for example adhesive squeezed from a gap between substrates or applied on surfaces should not be visible.

In view of the desired properties discussed above, and in view of the previous various attempts to address some of the deficiencies of cyanoacrylate adhesives, it would be desirable to provide cyanoacrylate compositions which cure to a polymeric material of desired flexibility both initially and on ageing, which do not have significant deterioration of other desired properties and which are colourless pre- and post-cure.

SUMMARY OF THE INVENTION

The present invention provides a cyanoacrylate composition comprising:
(i) at least one lower cyanoacrylate monomer component selected from ethyl cyanoacrylate or methoxy ethylcyanoacrylate;
(ii) at least one higher cyanoacrylate monomer component than in an amount greater than 12% by weight based on the total weight of the lower cyanoacrylate monomer and the higher cyanoacrylate monomer and which is selected from the group consisting of
n-propyl-cyanoacrylate, iso-propyl cyanoacrylate, n-butyl-cyanoacrylate, sec.-butyl-cyanoacrylate, iso-butyl-cyanoacrylate, tert-butyl-cyanoacrylate, n-pentyl-cyanoacrylate, 1-methyl-butyl-cyanoacrylate (also referred to as iso-pentyl-cyanoacrylate), 1-ethyl-propyl-cyanoacrylate, neopentyl-cyanoacrylate, n-hexyl-cyanoacrylate, 1-methyl pentyl-cyanoacrylate (also referred to as iso-hexyl-cyanoacrylate), n-heptyl-cyanoacrylate, n-octyl-cyanoacrylate, n-nonyl-cyanoacrylate, n-decyl-cyanoacrylate, n-undecyl-cyanoacrylate, n-dodecyl-cyanoacrylate, cyclohexyl-cyanoacrylate, benzyl-cyanoacrylate, phenyl-cyanoacrylate, tetrahydrofurfuryl-cyanoacrylate, allyl cyanoacrylate, propargyl-cyanoacrylate, 2-butenyl-cyanoacrylate, phenethyl-cyanoacrylate, chloropropyl-cyanoacrylate, ethoxyethyl-cyanoacrylate, ethoxypropyl-cyanoacrylate, ethoxy isopropyl-cyanoacrylate, propoxyethyl-cyanoacrylate, isopropoxyethyl-cyanoacrylate, butoxyethyl-cyanoacrylate, methoxypropyl-cyanoacrylate, methoxy isopropyl-cyanoacrylate, methoxy butyl-cyanoacrylate, propoxymethyl-cyanoacrylate, propoxy ethyl-cyanoacrylate, propoxy propyl-cyanoacrylate, butoxymethyl-cyanoacrylate, butoxyethyl-cyanoacrylate, butoxypropyl-cyanoacrylate, butoxyisopropyl-cyanoacrylate, butoxy butyl-cyanoacrylate, iso-nonyl-cyanoacrylate, iso-decyl-cyanoacrylate, cyclohexyl methyl-cyanoacrylate, naphtyl-cyanoacrylate, 2-(2'-methoxy)-ethoxy ethyl-cyanoacrylate, 2-(2'-ethoxy)-ethoxy ethyl-cyanoacrylate, 2-(2'-propyloxy)-ethoxy ethyl-cyanoacrylate, 2-(2'-butyloxy)-ethoxy ethyl-cyanoacrylate, 2-(2'-pentyloxy)-ethoxy ethyl-cyanoacrylate, 2-(2'-hexyloxy)-ethoxy ethyl-cyanoacrylate, 2-(2'-methoxy)-propyloxy propyl-cyanoacrylate, 2-(2'-ethoxy)-propyloxy propyl-cyanoacrylate, 2-(2'-propyloxy)-propyloxy propyl-cyanoacrylate, 2-(2'-pentyloxy)-propyloxy propyl-cyanoacrylate, 2-(2'-hexyloxy)-propyloxy propyl-cyanoacrylate, 2-(2'-methoxy)-butyloxy butyl-cyanoacrylate, 2-(2'-ethoxy)-butyloxy butyl-cyanoacrylate, 2-(2'-butyloxy)-butyloxy butyl-cyanoacrylate, 2-(3'-methoxy)-propyloxy ethyl-cyanoacrylate, 2-(3'-methoxy)-butyloxy ethyl-cyanoacrylate, 2-(3-methoxy)-propyloxy propyl-cyanoacrylate, 2-(3'-methoxy)-butyloxy propyl-cyanoacrylate, 2-(2'-methoxy)-ethoxy propyl-cyanoacrylate, 2-(2'-methoxy)-ethoxy butyl-cyanoacrylate;
(iii) at least one plasticiser component comprising at least one ester group containing plasticiser, the plasticiser component being miscible in a mixture of component (i) and component (ii) and being present in the composition in an amount within the range of between about 15 to about 40% by weight of the composition, and having an Ap/Po ratio in the range of about 1 to less than about 6 provided that pentaerythritoltetrabenzonate is not the sole plasticiser.

More particularly it is desirable that the composition of the invention is as detailed above except that the plasticiser component has a Ap/Po ratio of from about 1.25 to less than about 6 including also trimethyl trimellithate.

It has been surprisingly discovered by the present inventor that a careful selection of particular components for inclusion in the cyanoacrylate composition together with careful selection of the amounts of the components within certain defined parameters can result in a more regularly and reliably achievable flexible cured adhesive product which meet also the other desired criteria. The experimental data given below confirms the necessity to carefully select the components of the composition and the amounts of the components in order to achieve the desired characteristics in the polymerised material.

The compositions of the present invention demonstrate the desired properties referred to above and in addition show homogeneity.

When used to describe the ester group containing plasticisers for inclusion in compositions of the present invention the Ap/Po ratio is calculated for the purposes of the present invention as follows:
the total number of aliphatic $CH_3$, $CH_2$ and CH groups (which are not part of a carbonyl group) divided by the total number of ester groups. This property ratio is an adaptation of a property ratio discussed by Alan S. Wilson, "Plasticisers-Principles and Practice", Book 585 by the Institute of Materials, London (1995—see Section 1.7).

While good results are achieved with compositions containing plasticiser with an Ap/Po ratio of the plasticiser molecule in the range of about 1 to less than 6, it has been found that compositions of the invention where the Ap/Po ratio of the plasticiser is in the range of about 1.25 to about 5 such as from about 2 to about 5 more particularly from about 2 to about 4 give particularly desirable flexibility characteristics, while not deleteriously affecting other desirable properties of the cured composition such as for example bond strength and shelf life. A more restricted range where useful plasticiser may be found is where the Ap/Po ratio is from about 2 to about 4. Where more than one plasticiser is utilised it is desirable that they each independently have the desired Ap/Po ratio though the present invention requires that only one of the plasticisers has the desired Ap/Po ratio.

The amount of the plasticiser component in the composition has been determined as critical. Amounts up to 12% by weight of the composition do not result in the desired properties. Very high amounts of plasticiser component deleteriously affect cure speeds and bond strength so that it appears that the desired flexibility can be achieved in the cured compositions if amounts less than about 40% by weight of the composition are utilised. Good results have been observed where the plasticiser component is present in amounts from about 20 to about 30% by weight of the composition.

The skilled person will know which plasticiser components are to be employed in the compositions of the present invention. The Ap/Po ratio can be determined without any experimentation as only the structural formula of the plasticiser is required for the calculation of the ratio.

The plasticiser is suitably selected from at least one of alkyleneglycol diesters or hydroxy carboxylic acid esters. (Oligo) alkyleneglycol diesters of Formula I are useful:

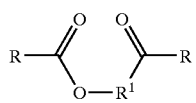

wherein:
each R is independently phenyl or hydroxyphenyl;
R'=—[(CH$_2$)$_n$—O]$_m$—;
n is an integer from 1 to 4; and
m is 1 or 2.

Useful hydroxy carboxylic acid esters include those wherein the structural formula of the plasticiser contains one or more moieties or "B" or "C" below, but at least one moiety "A". The two remaining free valences (at both ends of the molecule) are saturated either with —H or —CH$_3$.

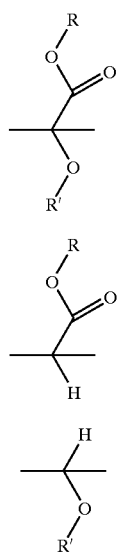

wherein:
R is —CH$_3$, C$_2$H$_5$, -propyl, -iso-propyl, -butyl, -iso-butyl, -sec.-butyl, -tert.-butyl; and
R' is —C(O)H, —C(O)CH$_3$, —C(O)C$_2$H$_5$.

In the case of more than one R group in a molecule, R is independently selected from those moities above i.e. each R group does not have to be the same. The same is true also for R' where there is more than one R'.

Examples of a hydroxy carboxylic acid esters is a citrate ester:

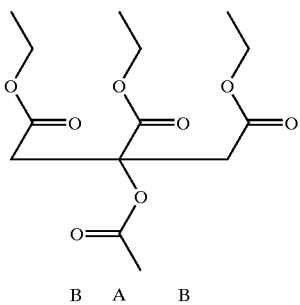

Thus the molecule would correspond to "H—B—A—B—H" (H=hydrogen terminus).

Other examples are esters of the following species: isocitric acid, tartaric acid, malic acid, lactic acid, glyceric acid and glycolic acid.

Suitable plasticisers for incorporation in the plasticiser component include the following trimethyl trimellitate, diethylene glycol dibenzoate, diethyl malonate, triethyl-O-acetyl citrate, benzylbutyl phthalate, dipropylene glycol dibenzoate, diethyl adipate, tributyl-O-acetyl citrate, dimethyl sebacate, and combinations thereof.

Plasticisers which have contributed to polymeric materials demonstrating particularly good properties include tributyl-O-acetyl citrate (TBAC), triethyl-O-acetyl citrate (TEAC), dipropylene glycol dibenzoate (DPGDB) and diethylene glycol dibenzoate (DEGBD).

Combinations of two or more of the exemplary components of the formulations of the present invention may be utilised. In the case of the plasticiser component it has been found that combinations of two or more plasticisers within those identified as being useful in the present invention may be used. In particular the following combination of plasticisers may be used: tributyl-O-acetyl citrate and triethyl-O-acetyl citrate.

It has been found that certain concentrations of the higher cyanoacrylate monomer component (or, the "co-monomer") within the composition does not achieve the desired flexibility in the cured product over time. The co-monomer may be considered to be a higher homologue of the lower cyanoacrylate monomer component. It is desired that the amount of the co-monomer in the composition is greater than or equal to about 15% by weight based on the combined weight of the lower cyanoacrylate monomer (the "monomer") and the co-monomer. Similarly high amounts of the co-monomer are undesired and compositions containing only the co-monomer used in the present invention do not necessarily show optimal results. Accordingly it is desired that the amount of co-monomer is within the range of from about 15 to about 75% by weight based on the combined weight of the monomer and the co-monomer. Desirable results are achieved with amounts of co-monomer within the range from about 17 to about 70% by weight based on the combined weight of the monomer and the co-monomer such as from about 17 to about 50%. An amount of from about 17 to about 45% by weight based on the combined weight of the monomer and the co-monomer may be used.

Suitably the co-monomer is selected from the group consisting of:
n-propyl-cyanoacrylate, iso-propyl cyanoacrylate, n-butyl-cyanoacrylate, sec.-butyl-cyanoacrylate, iso-butyl-cyanoacrylate, tert-butyl-cyanoacrylate, n-pentyl-cyanoacrylate, 1-methyl-butyl-cyanoacrylate (also referred to as iso-pentyl-cyanoacrylate), 1-ethyl-propyl-cyanoacrylate, neopentyl-cyanoacrylate, n-hexyl-cyanoacrylate, 1-methyl pentyl-cyanoacrylate (also referred to as iso-hexyl-cyanoacrylate), n-heptyl-cyanoacrylate, n-octyl-cyanoacrylate, n-nonyl-cyanoacrylate, n-decyl-cyanoacrylate, n-undecyl-cyanoacrylate, n-dodecyl-cyanoacrylate, cyclohexyl-cyanoacrylate, benzyl-cyanoacrylate, phenyl-cyanoacrylate, tetrahydrofurfuryl-cyanoacrylate, allyl cyanoacrylate, propargyl-cyanoacrylate, 2-butenyl-cyanoacrylate, phenethyl-cyanoacrylate, chloropropyl-cyanoacrylate, ethoxyethyl-cyanoacrylate, ethoxypropyl-cyanoacrylate, ethoxy isopropyl-cyanoacrylate, propoxyethyl-cyanoacrylate, isopropoxyethyl-cyanoacrylate, butoxyethyl-cyanoacrylate, methoxypropyl-cyanoacrylate, methoxy isopropyl-cyanoacrylate, methoxy butyl-cyanoacrylate, propoxymethyl-cyanoacrylate, propoxy ethyl-cyanoacrylate, propoxy propyl-cyanoacrylate, butoxymethyl-cyanoacrylate, butoxyethyl-cyanoacrylate, butoxypropyl-cyanoacrylate, butoxyisopropyl-cyanoacrylate, and butoxy butyl-cyanoacrylate. While the above co-monomers have been listed as a group for convenience the skilled artisan can select desirable ones for use in any particular composition with a selected end use.

Suitable co-monomers have been identified as isopropyl cyanoacrylate, n-butyl cyanoacrylate, sec-butyl cyanoacrylate, n-propyl cyanoacrylate, isobutyl cyanoacrylate, and n-hexyl cyanoacrylate.

Compositions of the present invention prepared and which contain particularly ethyl cyanoacrylate have demonstrated useful properties.

Desired combinations of CA's within the present invention include ethyl cyanoacrylate as monomer with n-butyl cyanoacrylate as co-monomer. In one embodiment of the invention this latter combination of monomer or co-monomer together with at least one of triethyl-O-acetyl citrate or diethyleneglycol dibenzoate as plasticiser, yield compositions which are desired, particularly where the plasticiser component is in the range of 20 to 30% by weight of the composition.

Typically the lower alkyl CA will be present in the composition in amounts from about 20 to about 70% by weight of the total composition.

Other components which may be added to the compositions of the present invention include thickening agents (polymers), tougheners (e.g. rubber-like materials, core-shell polymers) adhesion promoters, dyes, pigments, fluorescence markers, fixture time accelerators like crown-ethers, calixarenes, cyclodextrine-derivatives, polyethers and derivatives thereof as well as thixotropic agents e.g. silica.

Important additional components include thickeners such as polymethylmethacrylate (PMMA) or polyvinyl acetate in amounts from about 1 to 15% by weight of the composition. Loctite Products 424, 406, 416, and Sicomet 50 used in the Examples below all contain between about 4% and about 10% by weight of the composition of PMMA.

The invention also relates to a reaction product formed by curing of a composition according to the present invention. Also provided is a method of production of a composition according to the present invention comprising the step of admixing the lower cyanoacrylate component, the higher cyanoacrylate component and the plasticiser component under conditions which do not cure the composition.

The compositions of the invention may be used to bond substrates together, or to coat an article. The components of the invention may be used to form an assembly by applying the composition to at least a portion of the surface on a substrate and bonding a second substrate thereto by mating the substrates under conditions appropriate to cure the composition. Also provided is a coated article formed by applying a composition of the present invention to at least a portion of a surface of the article to form a coating and exposing the composition to conditions appropriate to cure the composition. Desirably the entire surface of the article is coated. The article could for example be wholly within a protective coating formed by the composition.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

The words "comprises/comprising" and the words "having/including" when used herein with reference to the present invention are used to specify the presence of stated features, integers, steps or components but does not preclude the presence or addition of one or more other features, integers, steps, components or groups thereof.

EXAMPLES

The following abbreviations are used in the Examples below:

| Abbreviations | | | |
|---|---|---|---|
| Adhesive Formulations (available from Loctite (Ireland) Ltd) | 406 | | Cyanoacrylate adhesive Loctite 406 (containing ethylcyanoacrylate) |
| | 416 | | Cyanoacrylate adhesive Loctite 416 (containing ethylcyanoacrylate) |
| | 424 | | Cyanoacrylate adhesive Loctite 424 (containing ethylcyanoacrylate) |
| | SIC50 | | Cyanoacrylate adhesive Sicomet 50 (containing ethylcyanoacrylate) |
| | 9006 | | Cyanoacrylate adhesive Sicomet 9006 (containing methoxy ethyl cyanoacrylate) |
| Monomers: | EtCA | | ethylcyanoacrylate |
| | iBuCA | | isobutylcyanoacrylate |
| | iPrCA | | isopropylcyanoacrylate |
| | MeCA | | methylcyanoacrylate |
| | nBuCA | | n-butylcyanoacrylate |
| | nHxCA | | n-hexylcyanoacrylate |
| | nPrCA | | n-propylcyanoacrylate |
| | sBuCA | | sec-butylcyanoacrylate |

| | | | Ap/Po-Ratio |
|---|---|---|---|
| Plasticisers: | BzBuPht | Benzylbutyl phthalate | 2.5 |
| | DBuAdp | Dibutyl adipate | 6 |
| | DBuSbc | Dibutyl sebacate | 8 |
| | DCpyAdp | Dicapryl adipate | 10 |
| | DCpyPht | Dicapryl phthalate | 8 |
| | DEGDB | Diethyleneglycol dibenzoate | 2 |
| | DEtAdp | Diethyl adipate | 4 |
| | DEtGlt | Diethyl glutarate | 3.5 |
| | DEtMlo | Diethyl malonate | 2.5 |
| | DEtPml | Diethyl pimelate | 4.5 |
| | DiNoPht | Diisononyl phthalate | 9 |
| | DMeAdp | Dimethyl adipate | 3 |
| | DMeGlt | Dimethyl glutarate | 2.5 |
| | DMeSbc | Dimethyl sebacate | 5 |
| | DOcPht | Dioctyl phthalate | 8 |
| | DPGDB | Dipropyleneglycol dibenzoate | 3 |
| | DPhE | Diphenyl ether | (not defined - non ester plasticiser) |
| | EtCpr | Ethyl caproate | 7 |
| | GTOl | Glyceroltrioleate | 18 |
| | iPrMyr | Isopropyl myristate | 16 |
| | MeLau | Methyl laurate | 12 |
| | MeSt | Methyl stearate | 18 |
| | PETA | Pentaerythritol tetraacrylate | 1 |
| | PEryTBnz | Pentaerythritoltetrabenzoate | 1 |
| | PNPGA | Poly(neopentyl glycoladipate) | 4 |
| | TBAC | Tributyl-O-acetyl citrate | 3.75 |
| | TCpyTrm | Tricapryl trimellithate | 8 |
| | TEAC | Triethyl-O-acetyl citrate | 2.25 |
| | THxTrm | Trihexyl trimellithate | 6 |
| | TiPrPhP | Tris(isopropyl phenyl)-phosphate | 9 |
| | TMeTrm | Trimethyl trimellithate | 1 |
| | TOcTrm | Trioctyl trimellithate | 8 |

-continued

| Abbreviations | | |
|---|---|---|
| Miscellaneous: | CA | Cyanoacrylate |
| | CoM | co-monomer |
| | conc. | concentration |
| | d | day(s) |
| | GBMS | degreased, grit-blasted mild steel |
| | PC | polycarbonate |
| | PVC | polyvinylchloride |
| | SF | substrate failure |
| | t | slightly turbid |
| | tt | significantly turbid |
| | ttt | extremely turbid; opaque (appears white) |
| | w | week(s) |
| | visc. | viscosity |

Experimental Procedure

The preparation of cured-CA-specimens was carried out as follows: To about 3.5 g of an adhesive formulation, monomer or monomer composition was added 3 drops of a CA-activator solution (0.5% 2,2'-dipyridyldisulfide in n-heptane) in a polyethylene (PE) beaker (diameter about 40 mm). A plasticiser component was added in the amounts indicated in the Tables which follow. Where a plasticiser component was added, it was mixed with the monomer, prior to the addition of the cyanoacrylate activator solution. After 5 seconds the sample is left undisturbed until curing of mixture. Thereafter the cured material can be removed from the PE beaker. This results in a relatively thin disc of the cured composition. Typically the thickness of the cured material is about 25 mm to about 3 mm.

Quantitative Determination of Flexibility of Polymerised Material

After the period of time specified in the particular Example below (1 day or 10 weeks) the specimen is cut into strips of approximately 1 mm in width by means of a pair of scissors.

| Determination of flexibility (visual inspection): | |
|---|---|
| Observation | Rating |
| Cured material splinters off while strip is cut with a pair of scissors | 0 |
| Cured material can be cut into a strip but has severe cracks, parts splinter off | 1 |
| Cured material can be cut into a strip but shows cracks and breaks if bent | 2 |
| Cured adhesive can be cut into strip, without any cracks appearing, but strip cracks if bent vigorously | 3 |
| Cured adhesive can be cut into strip without any cracks appearing, strip can be bent to and fro many times without any cracks appearing. | 4 |

Compositions of the invention should achieve a '3' or a '4' rating preferably a '4' rating.

Test Method for Turbidity (of Polymerised Material)

Disc of cured material is judged (by visual inspection) as follows:

| Visual test/appearance: | Rating |
|---|---|
| Does not appear turbid/hazy and is transparent → | None |
| Appears turbid/hazy but still transparent → | "t" |
| turbid/hazy, not transparent → | "tt" |
| extremely turbid; appears intensely white → | "ttt" |

It is desirable that compositions of the invention doe not result in a rating of "t", "tt" or "ttt". The ratings are assigned in parenthesis in the Tables below in the flexibility test columns. Where no turbidity was observed no rating is listed in the Tables. The turbidity test was carried out after the same periods as the flexibility test i.e. 1 day or 10 weeks. For those Examples where no flexibility test was carried out no turbidity test was carried out either.

Test Method for Tensile Shear Strength (of Polymerised Material)

This test method is based on the following standards:

ASTM D1002: Strength Properties of Adhesives in Shear by Tension Loading (Metal-to-Metal).

ASTM D3163: Strength Properties of Adhesively Bonded Rigid Plastic Lap-Shear Joints in Shear by Tension Loading.

ISO 4587 Adhesives—Determination of Tensile Lap-Shear Strength of High Strength Adhesive Bonds.

DIN EN 1465 Adhesives—Determination of Tensile lap-Shear Strength of Rigid-to-rigid bonded Assemblies.

Test Method for Shelf Life of Formulation

1. Check if formulation is still liquid after 10 weeks. If not no further testing required.
2. If the formulation is still liquid the viscosity of the liquid is then checked as follows: Measurement of viscosity (cone & plate system; at 20° C.). For comparison of samples' viscosities the viscosity after 3 days storage at 82° (in 20 g PE bottle) is divided by the initial viscosity. This viscosity ratio of a certain sample can be compared with the viscosity ratio of the control sample or other samples. The generation of this viscosity ratio enables one to compare different samples' stability (viscosity increase) independently of their initial viscosities.

Experimental Data

The experimental procedures (above) were repeated as necessary to achieve the results set out in the Tables below:

TABLE 1

Cyanoacrylate-monomers & standard grade adhesives (alone - no added plasticiser or co-monomer):

| Sample No. | CA-Adhesive | Flexibility after 1 d | (Cutting test) after 10 w |
|---|---|---|---|
| C1 | 424 | 0–1 | 0 |
| C2 | SIC50 | 1 | 0–1 |
| C3 | 406 | 0 | 0 |
| C4 | 416 | 0 | 0 |
| C5 | MeCA | 0 | 0 |
| C6 | EtCA | 0 | 0 |
| C7 | iPrCA | 0 | 0 |
| C8 | nBuCA | 0–1 | 0 |

TABLE 2

Cyanoacrylate monomers & cyanoacrylate adhesives with added plasticiser component:
(Concentration based on weight by weight of the total weight of the composition).

| Sample No. | Adhesive-Base | Plasticiser Identity | Conc. [%] | Flexibility after 1 d (turbidity rating) | Flexibility after 10 w (turbidity rating) | Ap/Po Ratio of plasticiser |
|---|---|---|---|---|---|---|
| 1 | EtCA | DCpyAdp | 25 | 1 (ttt) | | 10 |
| 2 | EtCA | MeLau | 25 | 0 (ttt) | | 12 |
| 3 | EtCA | THxTrm | 25 | 1 (tt) | 0–1 (tt) | 6 |
| 4 | EtCA | TCpyTrm | 25 | 1 (tt) | 0–1 (tt) | 8 |
| 5 | EtCA | iPrMyr | 25 | 0 (ttt) | | 16 |
| 6 | EtCA | GTOl | 25 | 0 (ttt) | | 18 |
| 7 | EtCA | TiPrPhP | 25 | 1–2 (t) | 0–1 (t) | 9 |
| 8 | EtCA | DCpyPht | 25 | 1 (tt) | | 8 |
| 9 | EtCA | DiNoPht | 25 | 0–1 (tt) | | 9 |
| 10 | EtCA | DBuSbc | 25 | 0 (ttt) | | 8 |
| 11 | EtCA | MeSt | 25 | 0 (ttt) | | 18 |
| 12 | 424 | DMeGlt | 30 | 4 | 4 | 2.5 |
| 13 | 424 | DMeAdp | 30 | 4 | 4 | 3 |
| 14 | 424 | DEtGlt | 30 | 4 (t) | 4 (t) | 3.5 |
| 15 | 424 | DMeSbc | 30 | 2 (tt) | 1 (tt) | 5 |
| 16 | 424 | DEtAdp | 10 | 0 | 0 | 4 |
| 17 | 424 | DEtAdp | 25 | 1–2 | 1 | 4 |
| 18 | 424 | DEtAdp | 30 | 3–4 | 3–4 (t) | 4 |
| 19 | 424 | DEtMlo | 10 | 0–1 | 0 | 2.5 |
| 20 | 424 | DEtMlo | 25 | 4 | 0 | 2.5 |
| 21 | 424 | DEtPml | 30 | 4 (tt) | 3–4 (tt) | 4.5 |
| 22 | 424 | DBuAdp | 30 | 0–1 (tt) | 0 (tt) | 6 |
| 23 | 424 | EtCpr | 30 | 0 (tt) | 0 (tt) | 7 |
| 24 | 424 | DEGDB | 10 | 0 | 0 | 2 |
| 25 | 424 | DEGDB | 25 | 4 | 0–1 | 2 |
| 26 | 424 | DPGDB | 25 | 1 (t) | 0 (t) | 3 |
| 27 | 424 | PEryTBnz | 30 | 0 (tt) | 0 (tt) | 1 |
| 28 | 424 | BzBuPht | 30 | 3–4 (t) | 2 | 2.5 |
| 29 | 424 | DOcPht | 10 | 0 (tt) | 0 (tt) | 8 |
| 30 | 424 | DOcPht | 25 | 0 (tt) | 0 (tt) | 8 |
| 31 | 424 | TMeTrm | 10 | 0 | 0 | 1 |
| 32 | 424 | TMeTrm | 25 | 1–2 | 0 | 1 |
| 33 | 424 | TOcTrm | 30 | 2 (tt) | 0 (tt) | 8 |
| 34 | 424 | TEAC | 20 | 1 | 0 | 2.25 |
| 35 | 424 | TEAC | 25 | 1–2 | 1 | 2.25 |
| 36 | 424 | TEAC | 30 | 1–2 | 1 | 2.25 |
| 37 | 424 | TBAC | 20 | 0–1 (ttt) | 0–1 (ttt) | 3.75 |
| 38 | Sic50 | TEAC | 18 | 3 | 1 | 2.25 |
| 39 | Sic50 | TEAC | 20 | 3–4 | 2 | 2.25 |
| 40 | Sic50 | TEAC | 25 | 4 | 2 | 2.25 |
| 41 | 406 | TEAC | 20 | 3–4 | 0–1 | 2.25 |
| 42 | 406 | TBAC | 20 | 2 (ttt) | 1 (ttt) | 3.75 |
| 43 | 416 | TEAC | 25 | 1–2 | 1 | 2.25 |
| 44 | iPrCA | TEAC | 18 | 4 | 0–1 | 2.25 |
| 45 | iPrCA | TEAC | 20 | 3 | 1 | 2.25 |
| 46 | iPrCA | TBAC | 20 | 2–3 | 0 | 3.75 |

TABLE 3

Cyanoacrylate/Co-monomer/Plasticiser component with mixtures of plasticisers:

| Sample No. | CA - Adhesive Monom.-base | Co-Monom. | % CoM of $\Sigma_{Monomer}$ | Plasticiser Substance | Conc. [%] | Flexibility after 1 d | after 10 w | Ap/Po Ratio |
|---|---|---|---|---|---|---|---|---|
| 47 | Sic50 | iPrCA | 25 | TEAC | 20 | 3–4 | 3 | 2.25 |
| 48 | Sic50 | iPrCA | 25 | TEAC | 25 | 4 | 4 | 2.25 |
| 49 | Sic50 | iPrCA | 50 | TEAC | 20 | 4 | 4 | 2.25 |
| 50 | 406 | iPrCA | 50 | TEAC | 20 | 3–4 | 3–4 | 2.25 |
| 51 | 406 | iPrCA | 25 | TEAC | 20 | 4 | 4 | 2.25 |
| 52 | 406 | iPrCA | 50 | TBAC | 20 | 3–4 | 3–4 | 3.75 |
| 53 | 406 | iPrCA | 25 | TBAC | 20 | 3 | 3 | 3.75 |
| 54 | 416 | nBuCA | 25 | TEAC | 25 | 3–4 | 4 | 2.25 |
| 55 | 416 | nBuCA | 33 | TEAC | 25 | 3–4 | 3–4 | 2.25 |
| 56 | 416 | nBuCA | 50 | TEAC | 25 | 4 | 4 | 2.25 |
| 57 | 424 | iPrCA | 25 | TEAC | 30 | 4 | 4 | 2.25 |

TABLE 3-continued

Cyanoacrylate/Co-monomer/Plasticiser component with mixtures of plasticisers:

| | CA - Adhesive | | | Plasticiser | | Flexibility | | |
|---|---|---|---|---|---|---|---|---|
| Sample No. | Monom.-base | Co-Monom. | % CoM of Σ$_{Monomer}$ | Substance | Conc. [%] | after 1 d | after 10 w | Ap/Po Ratio |
| 58 | 424 | nPrCA | 25 | TEAC | 20 | 4 | 4 | 2.25 |
| 59 | 424 | nPrCA | 25 | TEAC | 25 | 4 | 4 | 2.25 |
| 60 | 424 | nPrCA | 25 | TEAC | 30 | 4 | 4 | 2.25 |
| 61 | 424 | nBuCA | 25 | TEAC | 25 | 4 | 4 | 2.25 |
| 62 | 424 | nBuCA | 33 | TEAC | 25 | 4 | 4 | 2.25 |
| 63 | 424 | nBuCA | 25 | TEAC | 30 | 4 | 4 | 2.25 |
| 64 | 424 | nBuCA | 50 | TEAC | 25 | 4 | 4 | 2.25 |
| 65 | 424 | nBuCA | 25 | TBAC | 25 | 3–4 | 3–4 | 3.75 |
| 66 | 424 | nBuCA | 33 | TBAC | 25 | 4 | 4 | 3.75 |
| 67 | 424 | sBuCA | 25 | TEAC | 25 | 4 | 4 | 2.25 |
| 68 | 424 | sBuCA | 25 | TBAC | 25 | 3–4 | 4 | 3.75 |
| 69 | 424 | iBuCA | 25 | TEAC | 25 | 4 | 4 | 2.25 |
| 70 | 424 | iBuCA | 25 | TBAC | 25 | 4 | 4 | 3.75 |
| 71 | 424 | nHxCA | 25 | TEAC | 25 | 4 | 4 | 2.25 |
| 72 | 424 | nHxCA | 25 | TBAC | 25 | 4 | 4 | 3.75 |
| 73 | 424 | nBuCA | 25 | DEGDB | 10 | 0–1 | 0 | 2 |
| 74 | 424 | nBuCA | 10 | DEGDB | 25 | 4 | 3 | 2 |
| 75 | 424 | nBuCA | 25 | DEGDB | 25 | 4 | 3–4 | 2 |
| 76 | 424 | nBuCA | 33 | DEGDB | 25 | 4 | 4 | 2 |
| 77 | 424 | nBuCA | 60 | DEGDB | 25 | 4 | 4 | 2 |
| 78 | — | nBuCA | 100 | DEGDB | 25 | 4 | 4 | 2 |
| 79 | 424 | nBuCA | 10 | DPGDB | 25 | 3 | 3 | 3 |
| 80 | 424 | nBuCA | 25 | DPGDB | 25 | 4 | 4 | 3 |
| 81 | 424 | nBuCA | 33 | DPGDB | 25 | 4 | 4 | 3 |
| 82 | 424 | nBuCA | 60 | DPGDB | 25 | 4 | 4 | 3 |
| 83 | — | nBuCA | 100 | DPGDB | 25 | 4 | 4 | 3 |
| 84 | 424 | nBuCA | 25 | DEtAdp | 10 | 1–2 | 0 | 2 |
| 85 | 424 | nBuCA | 25 | DEtAdp | 25 | 4 | 3–4 | 2 |
| 86 | 424 | nBuCA | 25 | DEtMlo | 10 | 3 | 1 | 2.5 |
| 87 | 424 | nBuCA | 25 | DEtMlo | 25 | 4 | 3–4 | 2.5 |
| 88 | 424 | nBuCA | 33 | EtCpr | 25 | 3–4 | 2–3 | 7 |
| 89 | 424 | nBuCA | 25 | DOcPht | 10 | 0–1 | 0–1 | 8 |
| 90 | 424 | nBuCA | 25 | DOcPht | 25 | 1 | 0 | 8 |
| 91 | 424 | nBuCA | 33 | DOcPht | 25 | 2–3 | 2 (ttt) | 8 |
| 92 | 424 | nBuCA | 25 | TMeTrm | 10 | 1 | 0 | 1 |
| 93 | 424 | nBuCA | 25 | TMeTrm | 25 | 3–4 | 3–4 | 1 |
| 94 | 424 | nBuCA | 33 | TMeTrm | 25 | 4 | 4 | 1 |
| 95 | 424 | nBuCA | 33 | PEryTBnz | 25 | 0 | 0 | 1 |
| 96 | 424 | nBuCA | 33 | DMeSbc | 25 | 4 | 4 | 5 |
| 97 | 424 | iPrCA | 10 | DMeSbc | 30 | 3 (tt) | 3 (tt) | 5 |
| 98 | 424 | iPrCA | 20 | DMeSbc | 30 | 3 (tt) | 3 (tt) | 5 |
| 99 | 424 | iPrCA | 50 | DMeSbc | 30 | 4 | 4 | 5 |
| 100 | — | iPrCA | 100 | DMeSbc | 30 | 4 | 4 | 5 |
| 101 | 424 | iPrCA | 10 | DBuAdp | 30 | 0 (ttt) | 0 (ttt) | 6 |
| 102 | 424 | iPrCA | 20 | DBuAdp | 30 | 0 (ttt) | 0 (ttt) | 6 |
| 103 | 424 | iPrCA | 50 | DBuAdp | 30 | 0 (ttt) | 0 (ttt) | 6 |
| 104 | — | iPrCA | 100 | DBuAdp | 30 | 0–1 (t) | 0 (tt) | 6 |
| 105 | 424 | iPrCA | 10 | EtCpr | 30 | 1 (tt) | 0 (ttt) | 6 |
| 106 | 424 | iPrCA | 20 | EtCpr | 30 | 0 (ttt) | 0 (ttt) | 7 |
| 107 | 424 | iPrCA | 50 | EtCpr | 30 | 2 (tt) | 1 (ttt) | 7 |
| 108 | — | iPrCA | 100 | EtCpr | 30 | 3–4 | 2 | 7 |
| 109 | 424 | iPrCA | 10 | PEryTBnz | 30 | 0 (ttt) | 0 (ttt) | 1 |
| 110 | 424 | iPrCA | 20 | PEryTBnz | 30 | 1 (tt) | 0 (tt) | 1 |
| 111 | 424 | iPrCA | 50 | PEryTBnz | 30 | 0 (tt) | 0 (tt) | 1 |
| 112 | — | iPrCA | 100 | PEryTBnz | 30 | 0 (tt) | 0 (tt) | 1 |
| 113 | 424 | iPrCA | 10 | TOcTrm | 30 | 2 (tt) | 2 (tt) | 8 |
| 114 | 424 | iPrCA | 20 | TOcTrm | 30 | 2 (tt) | 0 (tt) | 8 |
| 115 | 424 | iPrCA | 50 | TOcTrm | 30 | 2 (tt) | 1 (tt) | 8 |
| 116 | — | iPrCA | 100 | TOcTrm | 30 | 2–3 (tt) | 1 (tt) | 8 |
| 117 | 424 | iPrCA | 10 | BzBuPht | 30 | 3–4 (t) | 2 | 2.5 |
| 118 | 424 | iPrCA | 20 | BzBuPht | 30 | 4 | 4 | 2.5 |
| 201 | 9006 | | | | | 0 | 0 | |
| 202 | 9006 | | | DEGDB | 25 | 4 | 4 | 2 |
| 203 | 9006 | | | TEAC | 25 | 4 | 4 | 2.25 |
| 204 | 9006 | BuCA | 30 | DEGDB | 25 | 4 | 4 | 2 |
| 205 | 9006 | BuCA | 30 | TEAC | 25 | 4 | 4 | 2.25 |
| 206 | MeCA | | | | | 0 | 0 | |
| 207 | MeCA | | | DEGDB | 25 | 0 (t) | 0 (t) | 2 |
| 208 | MeCA | | | TEAC | 25 | 0 (tt) | 0 (tt) | 2.25 |
| 209 | MeCA | BuCA | 40 | DEGB | 25 | 2 | 1 | 2 |
| 210 | MeCA | BuCA | 40 | TEAC | 25 | 3 | 1 | 2.25 |
| 211 | MeCA | | | PNPGA | 25 | 3 (ttt) | 1 (ttt) | 4 |

TABLE 3-continued

Cyanoacrylate/Co-monomer/Plasticiser component with mixtures of plasticisers:

| Sample No. | CA - Adhesive | | | Plasticiser | | Flexibility | | Ap/Po Ratio |
|---|---|---|---|---|---|---|---|---|
| | Monom.-base | Co-Monom. | % CoM of Σ$_{Monomer}$ | Substance | Conc. [%] | after 1 d | after 10 w | |
| 212 | MeCA | BuCA | 40 | PNPGA | 25 | 3 | 0 | 4 |
| 213 | EtCA | 9006 | 25 | DEGDB | 25 | 3–4 | 3 | 2 |
| 214 | EtCA | 9006 | 25 | TEAC | 25 | 4 | 2 | 2.25 |
| 215 | EtCA | 9006 | 25 | BzBuPht | 25 | 4 | 2 | 2.5 |
| 216 | MeCA | | | TMeTrm | 25 | 0 | 0 | 1 |
| 217 | MeCA | | | PETA | 25 | 0 (tt) | 0 (tt) | 1 |
| 218 | MeCA | | | DPhE | 25 | 0 (tt) | 0 (tt) | not defined |
| 219 | MeCA | BuCA | 40 | TMeTrm | 25 | 3 | 0 | 1 |
| 220 | MeCA | BuCA | 40 | PETA | 25 | 4 | 0 | 1 |
| 221 | MeCA | BuCA | 40 | DPhE | 25 | 4 | 0 | not defined |

TABLE 4

Cyanoacrylate/Co-monomer/plasticiser component containing mixtures:

| No. | CA - Adhesive | | | Plasticiser Component | | Flexibility | |
|---|---|---|---|---|---|---|---|
| | Monom.-base | Co-Monom. | % CoM of Σ$_{Monomer}$ | Plasticiser Combination | Conc. [%] | after 1 d | after 10 w |
| 119 | 424 | | | TEAC; TBAC | 10; 10 | 1 | 0–1 |
| 120 | 424 | | | TEAC; TBAC | 13; 13 | 1 | 1 |
| 121 | 424 | | | TEAC; TBAC | 15; 15 | 1 (tt) | 1 (tt) |
| 122 | Sic50 | | | TEAC; TBAC | 10; 10 | 2–3 | 1 |
| 123 | Sic50 | | | TEAC; TBAC | 15; 15 | 4 | 1 |
| 124 | 406 | | | TEAC; TBAC | 10; 10 | 3–4 | 1 |
| 125 | — | iPrCA | 100 | TEAC; TBAC | 10; 10 | 2–3 | 0 |
| 126 | Sic50 | iPrCA | 50 | TEAC; TBAC | 10; 10 | 4 | 4 |
| 127 | Sic50 | iPrCA | 50 | TEAC; TBAC | 15; 15 | 4 | 4 |
| 128 | 406 | iPrCA | 50 | TEAC; TBAC | 6; 6 | 1–2 | 0–1 |
| 129 | 406 | iPrCA | 50 | TEAC; TBAC | 10; 10 | 4 | 3–4 |
| 130 | 406 | iPrCA | 25 | TEAC; TBAC | 6; 6 | 1–2 | 1 |
| 131 | 406 | iPrCA | 25 | TEAC; TBAC | 10; 10 | 3–4 | 3–4 |
| 132 | 424 | nBuCA | 25 | TEAC; TBAC | 13; 13 | 4 | 4 |
| 133 | 424 | nBuCA | 25 | TEAC; TBAC | 15; 15 | 4 | 4 |

AP/Po ratio of TEAC is 2.25. Ap/Po ratio of mAC is 3.75.

TABLE 5

Tensile shear strengths of cyanoacrylate/co-monomer/plasticiser component containing mixtures:

| No. | CA - Adhesive | | | Plasticiser Component | | Tensile Shear Strengths [N/mm] | | |
|---|---|---|---|---|---|---|---|---|
| | Monom.-base | Co-Monom. | % CoM of Σ$_{Monomer}$ | Plasticiser | Conc. [%] | Perspex | PC PVC | GBMS |
| C1 | 424 | — | — | — | — | SF | 7.5 SF | 16.1 |
| 54 | 416 | nBuCA | 25 | TEAC | 25 | SF | SF | |
| 56 | 416 | nBuCA | 50 | TEAC | 25 | SF | 6.1 SF | 15.8 |
| 58 | 424 | nPrCA | 25 | TEAC | 20 | | SF | |
| 61 | 424 | nBuCA | 25 | TEAC | 25 | | 7.6 SF | 14.5 |
| 63 | 424 | nBuCA | 25 | TEAC | 30 | | 7 SF | |

TABLE 6

Polarity parameters of plasticisers:

| Plasticiser | Ap/Po | Plasticising Effect in CA/Co M Formulations | Based on Comparison between examples in: Table 2 | Table 3 |
|---|---|---|---|---|
| PEryTBnz | 1 | – | 27 | 95; 109–112 |
| TMeTrm | 1 | + | 31; 32 | 93; 94 |
| DEGDB | 2 | + | 24; 25 | 73–78 |
| DEtMlo | 2.5 | + | 19; 20 | 86; 87 |
| TEAC | 2.25 | + | 34–36; 38–41; 43–45 | 47–51; 54–64; 67; 69; 71 |
| BzBuPht | 2.5 | + | 28 | 117; 118 |
| DPGDB | 3 | + | 25; 26 | 79–83 |
| DEtAdp | 4 | + | 16–18 | 84; 85 |
| TBAC | 3.75 | + | 37; 42; 46 | 52; 53; 65; 66; 68; 70; 72 |
| DMeSbc | 5 | + | 15 | 97–100 |
| DBuAdp | 6 | – | 22 | 101–104 |
| EtCpr | 7 | – | 23 | 88; 105–108 |
| DOcPht | 8 | – | 29; 30 | 89–91 |
| TOcTrm | 8 | – | 33 | 113–116 |

TABLE 7

Storage Stability "Shelf-Life" data.

| No. | Visc. Initial [mPas] | Visc. After 3d,82° C. [mPas] | Ratio (visc$_{3d,82°C.}$/ visc$_{initial}$) | Fixture time on EPDM-foam rubber (in seconds) |
|---|---|---|---|---|
| C1 (control) | 114 | 270 | 2.37 | 6 |
| 48 | 35.4 | 107 | 3.0 | 8 |
| 54 | 625 | 1320 | 2.11 | 8 |
| 59 | 42.5 | 98.3 | 2.31 | 7 |
| 61 | 44.4 | 124 | 2.79 | 22 |
| 62 | 38.1 | 80.3 | 2.1 | |
| 63 | 39.9 | 156 | 3.91 | 26 |
| 75 | 740 | 1380 | 1.86 | 21 |
| 80 | 684 | 1210 | 1.77 | 15 |

Discussion of Results

Table 1 sets out the results determined for proprietary cyanoacrylate adhesive formulations or pure monomer. These compositions are not within the scope of the present invention. As can be seen from Table 1 all of the cured materials performed poorly achieving a rating of 0 or 0–1 when the flexibility test is performed. As a flexibility rating was determined by the first step in the procedure it was not necessary to carry out the further testing steps. Table 1 refers to the "cutting test" i.e. the first test in the test for flexibility described above.

Table 1 demonstrates the type of brittleness associated with cyanoacrylic acid esters taken alone as well as with proprietary adhesives (All adhesives referred to by a product reference in the following Tables are available under that product reference from Loctite (Ireland) Limited in Tallaght, Dublin, Ireland). All of the monomers and the adhesive formulations were found to form a brittle material on curing.

Table 2 shows CA-monomer and proprietary cyanoacrylate adhesive formulations to each of which has had added as described above an indicated amount of an identified plasticiser component. In most of the Examples contained within Table 2 the added plasticiser component does not enhance flexibility significantly as compared to the non-plasticised compositions of Table 1. This can be see for example from Examples: 1–11; 15–17; 19; 22–24; 26; 27; 29–37; 42; 43. While certain Examples of Table 2 show a degree of greater flexibility initially (after 1 day) as compared to the control compositions of Table 1, this often does not last very long, embrittlement is often found after a certain period of time (10 weeks): e.g. Examples 20; 25; 28; 38; 41; 44–46. Lasting flexibilisation (after 10 weeks) is found in only very few cases: Examples 12–14; 18; 21. Some of the compositions showing desired flexibility do no demonstrate the desired transparency being rated (t), (tt) or (ttt) under the turbidity test above.

Table 3:It was found that certain CA/plasticiser component mixtures remain flexible if in addition to a lower cyanoacrylate monomer base an amount of a higher homologue CA-monomer (a co-monomer) is included (referred to in the Tables as "Co-Monom" or "CoM"). Careful consideration of Table 3 allows for the selection of criteria for preparing formulations with lasting flexibility. In particular it can be identified from Table 3 that suitable co-monomers include: n-propylcyanoacrylate, n-butylcyanoacrylate, n-hexylcyanoacrylate, iso-propylcyanoacrylate, iso-butylcyanoacrylate and sec-butylcyanoacrylate. In Table 3 co-monomer concentrations of 10–100% (referring to the CA-co-monomer fraction in the formulation) have been utilised. (It should be noted that not all of the compositions of Table 3 are within the scope of the present invention). Concentrations $\leq 10\%$ appear to be too low in order to maintain optimal flexibilisation (embrittlement at least in part, can be found); see Example 117.

The continuation of Table 3 demonstrates that where the monomer is methoxy methyl cyanoacrylate (as in the 9006 product) the monomer by itself cures to a brittle polymer whilst added plasticiser component dramatically increases flexibility without any observed turbidity. Presence of both co-monomer and plasticiser component in the composition also provides highly desirable formulations (see no.s 204–205). The continuation part of Table 3 also demonstrates that MeCA is not suited for use as the monomer base. None of the formulations (206–212 or 216 to 221) which include MeCA above; MeCA and plasticiser; MeCA and both plasticiser and co-monomer; exhibit desired flexibility. EtCA formulations with 9006 as co-monomer did not exhibit desired properties either.

Table 4: A relatively high concentration of co-monomer does not necessarily result in optimal flexibility either for example in the case of 100% of a component identified as a suitable co-monomer for inclusion in compositions in the present invention. A comparison of Examples 122; 125 and 126 of Table 4 demonstrates that only the compositions containing a monomer blend show flexibility. Mixtures of adhesive/plasticiser component or co-monomer/plasticiser component do not show optimal results. It can be concluded from a consideration of the foregoing that the suitable concentration of co-monomer would generally be between about 12 and about 75%, preferably between about 15 and about 50% of total monomer.

Plasticiser component: It was found that only plasticisers within a certain range of polarity parameters render the cured adhesive reliably flexible when used as plasticiser component. Table 6 shows the Ap/Po-ratios of some plasticisers with comparison of formulations between Tables 2 and 3. The Ap/Po ratio of TEAC; TBAC is 2.25;3.75. Table 6 reveals that plasticisers with ratios between 1 and less than 6, especially between 2–5 when used within compositions of the present invention result in a flexibilised polymeric material (the '+' and '–' symbols refer to examples of flexible formulations in Table 3.). Plasticisers with an AP/Po ratio of 6 or greater such as DBuAdp, EtCpr, DOcPht, TOTrm do not appear to demonstrate the desired effect.

Examples (Table 3) 73; 84; 86; 92; (Table 4) 128; 130 demonstrate that concentrations of plasticiser component of up to 12% by weight of the composition are not sufficient. Suitable amounts of the plasticiser component have been identified as from about 15 to about 40%, suitably about 20 to about 30% by weight of the formulation.

More than one plasticiser can be employed in the plasticiser component of compositions of the present invention. Table 4 lists Examples of compositions of the present invention in which two plasticisers have been employed. Examples 119–124 serve as controls against the adhesive formulation employed. Example 125 serves as a control against the co-monomer employed.

Compositions according to the present invention are transparent and cure to form a transparent polymeric material as can be seen in particular from Tables 3 and 4. No turbidity, whitening or haze of cured samples was observed. Furthermore the compositions are colourless. This is an important consideration as many customers who purchase compositions such as those of the present invention expect clear colourless adhesives in the liquid state as well as in the hardened adhesive.

Table 5 shows tensile shear values of certain Exemplary formulations within the scope of the present invention which were measured according to the method set out above. A tensile shear value of a proprietary CA-formulation (labelled C1) is included in the Table as a control for comparative purposes. The data in Table 5 shows that polymers of formulations of the present invention have comparable tensile shear strengths to polymers of the control formulation.

Table 7 gives stability/shelf life data for some formulations listed above (all formulations were found to be still liquid after 10 weeks with no visible change in viscosities). An accelerated ageing test—i.e. storage at elevated temperature was carried out in order to mimic long term storage at room temperature. It is thought that 3 days at 82° C. would correspond to ca 730 days at room temperature following the Van't Hoff Law (The Van't Hoff Law states that each increase of 10° C. in temperature results in approximately a three fold increase in the reaction rate. Since the ageing of the adhesive follows the law and the temperature difference between room temperature and 82° C. is ca 60° C. the calculation is 3 days×($3^6$)=729 days) it can be concluded that the shelf lives of the samples would be at least 2 years at room temperature.

Furthermore the shelf lives of the compositions of the present invention (as determined by the method described above) were found to be as good as shelf lives of typical standard CA-adhesives. Table 7 shows the results of storage at elevated T. The increase of viscosity is low and comparable to the unmodified control (detailed explanation see Table 7). A shelf life of >2 years can be assumed. The fixture times of samples according to this invention are also recorded in Table 7. All samples cure within seconds, demonstrating their usefulness as instant adhesives.

The full scope of the invention is defined by the claims.

What is claimed is:

1. A cyanoacrylate composition comprising:
   (i) at least one lower cyanoacrylate monomer component selected from the group consisting of ethyl cyanoacrylate and methoxycyanoacrylate;
   (ii) at least one higher cyanoacrylate monomer component in an amount greater than 12% by weight based on the total weight of the combination of the lower cyanoacrylate monomer and the higher cyanoacrylate monomer, and selected from the group consisting of:
   n-propyl-cyanoacrylate, iso-propyl cyanoacrylate, n-butylcyanoacrylate, sec-butyl-cyanoacrylate, iso-butyl-cyanoacrylate, tert-butyl-cyanoacrylate, n-pentyl-cyanoacrylate, 1-methyl-butyl-cyanoacrylate, 1-ethyl-propyl-cyanoacrylate, neopentyl-cyanoacrylate, n-hexyl-cyanoacrylate, 1-methyl pentyl-cyanoacrylate, n-heptyl-cyanoacrylate, n-octyl-cyanoacrylate, n-nonyl-cyanoacrylate, n-decyl-cyanoacrylate, n-undecyl-cyanoacrylate, n-dodecyl-cyanoacrylate, cyclohexyl-cyanoacrylate, benzyl-cyanoacrylate, phenyl-cyanoacrylate, tetrahydrofurfuryl-cyanoacrylate, allyl cyanoacrylate, propargyl-cyanoacrylate, 2-butenyl-cyanoacrylate, phenethyl-cyanoacrylate, chloropropyl-cyanoacrylate, ethoxyethyl-cyanoacrylate, ethoxypropyl-cyanoacrylate, ethoxy isopropyl-cyanoacrylate, propoxyethyl-cyanoacrylate, isopropoxyethyl-cyanoacrylate, butoxyethyl-cyanoacrylate, methoxypropyl-cyanoacrylate, methoxy isopropyl-cyanoacrylate, methoxy butyl-cyanoacrylate, propoxymethyl-cyanoacrylate, propoxy ethyl-cyanoacrylate, propoxy propyl-cyanoacrylate, butoxymethyl-cyanoacrylate, butoxyethyl-cyanoacrylate, butoxypropyl-cyanoacrylate, butoxyisopropyl-cyanoacrylate, butoxy butyl-cyanoacrylate, iso-nonyl-cyanoacrylate, iso-decyl-cyanoacrylate, cyclohexyl methyl-cyanoacrylate, naphtyl-cyanoacrylate, 2-(2'-methoxy)-ethoxy ethyl-cyanoacrylate, 2-(2'-ethoxy)-ethoxy ethyl-cyanoacrylate, 2-(2'-propyloxy)-ethoxy ethyl-cyanoacrylate, 2-(2'-butyloxy)-ethoxy ethyl-cyanoacrylate, 2-(2'-pentyloxy)-ethoxy ethyl-cyanoacrylate, 2-(2'-hexyloxy)-ethoxy ethyl-cyanoacrylate, 2-(2'-methoxy)-propyloxy propyl-cyanoacrylate, 2-(2'-ethoxy)-propyloxy propyl-cyanoacrylate, 2-(2'-propyloxy)-propyloxy propyl-cyanoacrylate, 2-(2'-pentyloxy)-propyloxy propyl-cyanoacrylate, 2-(2'-hexyloxy)-propyloxy propyl-cyanoacrylate, 2-(2'-methoxy)-butyloxy butylcyanoacrylate, 2-(2'-ethoxy)-butyloxy butyl-cyanoacrylate, 2-(2'-butyloxy)-butyloxy butyl-cyanoacrylate, 2-(3'-methoxy)-propyloxy ethyl-cyanoacrylate, 2-(3'-methoxy)-butyloxy ethyl-cyanoacrylate, 2-(3'-methoxy)-propyloxy propyl-cyanoacrylate, 2-(3'-methoxy)-butyloxy propyl-cyanoacrylate, 2-(2'-methoxy)-ethoxy propyl-cyanoacrylate, and 2-(2'-methoxy)-ethoxy, butyl-cyanoacrylate;
   (iii) at least one plasticiser component comprising at least one ester group containing plasticiser, the plasticiser component being miscible in a mixture of component (i) and component (ii);
   the plasticiser component being present in the composition in an amount between about 15 to about 40% by weight of the composition, and the plasticiser component having an Ap/Po ratio in the range of about 1 to less than about 6, provided the plasticiser component does not include pentaerythritoltetrabenzoate as the sole plasticiser.

2. A cyanoacrylate composition comprising:
   (i) at least one lower cyanoacrylate monomer component as defined in claim 1;
   (ii) at least one higher cyanoacrylate monomer component as defined in claim 1; and
   (iii) at least one plasticiser component comprising at least one ester group containing plasticiser, the plasticiser component being miscible in a mixture of component (i) and component (ii);

the plasticiser component being present in the composition in an amount between about 15 to about 40% by weight of the composition, and the plasticiser having an Ap/Po ratio in the range of about 1.25 to less than about 6 and/or the plasticiser component comprising trimethyl trimellitate.

3. A composition according to claim 2, wherein the Ap/Po ratio of the plasticiser is in the range of about 1.25 to about 5.

4. A composition according to claim 2, wherein the plasticiser is present in an amount from about 20 to about 30% by weight of the composition.

5. A composition according to claim 2, wherein the plasticiser is a member selected from the group consisting of alkyleneglycol diesters of Formula I:

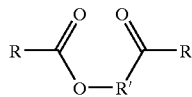

wherein:
each R is independently phenyl or hydroxyphenyl;
R'=—[(CH$_2$)$_n$—O]$_m$—;
n is an integer from 1 to 4; and
m is 1 or 2;
hydroxy carboxylic acid esters wherein the structural formula of the plasticiser contains one or more moieties A or B or C below provided that it contains at least one moiety A and wherein the two remaining free valences are saturated either with —H or —CH$_3$:

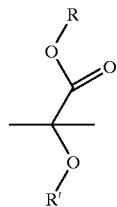

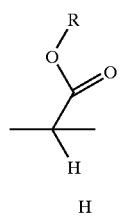

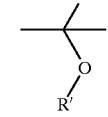

wherein:
R is a member selected from the group consisting of —CH$_3$, —C$_2$H$_5$, -propyl, -iso-propyl, -butyl, -iso-butyl, -sec-butyl, and -tert-butyl; and
R' is a member selected from the group consisting of —C(O)H, —C(O)CH$_3$, and —C(O)C$_2$H$_5$, provided that in the case of more than one R group in a molecule, each R is independently selected from —CH$_3$, C$_2$H$_5$, -propyl, -iso-propyl, -butyl, -iso-butyl, -sec-butyl, and -tert-butyl; and provided that where there is more than one R', each R' is independently selected from a member selected from the group consisting of C(O)H, —C(O)CH$_3$, and —C(O)C$_2$H$_5$.

6. A composition according to claim 2, wherein the plasticiser is an ester of one or more acids selected from the group consisting of isocitric acid, tartaric acid, malic acid, lactic acid, glyceric acid and glycolic acid.

7. A composition according to claim 2, wherein the plasticiser is a member selected from the group consisting of: trimethyl trimellitate, diethylene glycol dibenzoate, diethyl malonate, triethyl-O-acetyl citrate, benzylbutyl phthalate, dipropylene glycol dibenzoate, diethyl adipate, tributyl-O-acetyl citrate, dimethyl sebacate, and combinations thereof.

8. A composition according to claim 2, wherein the plasticiser is a member selected from the group consisting of: tributyl-O-acetyl citrate, triethyl-O-acetyl citrate, dipropylene glycol dibenzoate, diethylene glycol dibenzoate and combinations thereof.

9. A composition according to claim 2, wherein the plasticiser comprises a combination of tributyl-O-acetyl citrate and triethyl-O-acetyl citrate.

10. A composition according to claim 2, wherein the higher cyanoacrylate monomer is present in an amount of at least about 15% by weight based on the combined weight of the lower cyanoacrylate monomer and the higher cyanoacrylate monomer.

11. A composition according to claim 2, wherein the higher cyanoacrylate monomer is present in an amount within the range from about 15 to about 75% by weight based on the combined weight of the lower cyanoacrylate monomer and the higher cyanoacrylate monomer.

12. A composition according to claim 2, wherein the amount of higher cyanoacrylate monomer is within the range from about 17 to about 70% by weight based on the combined weight of the lower cyanoacrylate monomer and the higher cyanoacrylate monomer.

13. A composition according to claim 2, wherein the amount of higher cyanoacrylate monomer is within the range from about 17 to about 65% by weight based on the combined weight of the lower cyanoacrylate monomer and the higher cyanoacrylate monomer.

14. A composition according to claim 2, wherein the amount of higher cyanoacrylate monomer is within the range from about 17 to about 45% by weight based on the combined weight of the lower cyanoacrylate monomer and the higher cyanoacrylate monomer.

15. A composition according to claim 2, wherein the higher cyanoacrylate monomer is a member selected from the group consisting of n-propyl-cyanoacrylate, iso-propyl cyanoacrylate, n-butyl-cyanoacrylate, sec-butyl-cyanoacrylate, iso-butyl-cyanoacrylate, tert-butyl-cyanoacrylate, n-pentyl-cyanoacrylate, 1-methyl-butyl-cyanoacrylate, 1-ethyl-propyl-cyanoacrylate, neopentyl-cyanoacrylate, n-hexyl-cyanoacrylate, 1-methyl pentyl-cyanoacrylate, n-heptyl-cyanoacrylate, n-octyl-cyanoacrylate, n-nonyl-cyanoacrylate, n-decyl-cyanoacrylate, n-undecyl-cyanoacrylate, n-dodecyl-cyanoacrylate, cyclohexyl-cyanoacrylate, benzyl-cyanoacrylate, phenyl-cyanoacrylate, tetrahydrofurfuryl-cyanoacrylate, allyl cyanoacrylate, propargyl-cyanoacrylate, 2-butenyl-cyanoacrylate, phenethyl-cyanoacrylate, chloropropyl-cyanoacrylate, ethoxyethyl-cyanoacrylate, ethoxypropyl-cyanoacrylate, ethoxy isopropyl-cyanoacrylate, propoxyethyl-cyanoacrylate, iso-propoxyethyl-cyanoacrylate, butoxyethyl-cyanoacrylate, methoxypropyl-cyanoacrylate, methoxy isopropyl-cyanoacrylate, methoxy butyl-cyanoacrylate, propoxymethyl-cyanoacrylate, propoxy ethyl-cyanoacrylate, propoxy propyl-cyanoacrylate, butoxymethyl-cyanoacrylate, butoxyethyl-cyanoacrylate, butoxypropyl-cyanoacrylate, butoxyisopropyl-cyanoacrylate, butoxy butyl-cyanoacrylate and combinations thereof.

16. A composition according to claim 2, wherein the higher cyanoacrylate monomer is a member selected from the group consisting of isopropyl cyanoacrylate, n-butyl cyanoacrylate, sec-butyl cyanoacrylate, n-propyl cyanoacrylate, isobutyl cyanoacrylate, n-hexyl cyanoacrylate, and combinations thereof.

17. A composition according to claim 2, wherein the lower alkyl cyanoacrylate monomer is present in an amount from about 20 to about 70% by weight based on the total weight of the composition.

18. A reaction product formed by curing of a composition according to claim 2.

19. A method of production of a composition according to claim 2 comprising the step of admixing the lower cyanoacrylate monomer, the higher cyanoacrylate monomer and the plasticiser under conditions which do not cure the composition.

20. A process of using a composition according to claim 2 to bond substrates together, comprising the steps of;
providing a first substrate;
applying the composition onto a surface of the first substrate; and
mating a second substrate with the composition-coated first substrate to form a bond therebetween after exposure to conditions appropriate to cure the composition.

21. A process of using a composition according to claim 2 to coat an article, comprising the steps of:
providing a substrate; and
applying the composition over at least a portion of the substrate to form a coating thereon after exposure to conditions appropriate to cure the composition.

22. An assembly formed by applying a composition according to claim 2 to at least a portion of a surface of a substrate and bonding a second substrate thereto by mating the substrates under conditions appropriate to cure the composition.

23. A coated article formed by applying a composition according to claim 2 to at least a portion of a surface of the article to form a coating and exposing the composition to conditions appropriate to cure the composition.

24. An article according to claim 23, wherein the entire surface of the article is coated.

25. A composition according to claim 1, wherein the Ap/Po ratio of the plasticiser is in the range of about 1.25 to about 5.

26. A composition according to claim 1, wherein the plasticiser is present in an amount from about 20 to about 30% by weight of the composition.

27. A composition according to claim 1, wherein the plasticiser is selected from the group consisting of alkyleneglycol diesters of Formula I:

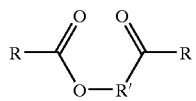

wherein:
each R is independently phenyl or hydroxyphenyl;
R'=—[(CH$_2$)$_n$—O]$_m$—;
n is an integer from 1 to 4; and
m is 1 or 2;
hydroxy carboxylic acid esters wherein the structural formula of the plasticiser contains one or more moieties A or B or C below provided that it contains at least one moiety A and wherein the two remaining free valences are saturated either with —H or —CH$_3$:

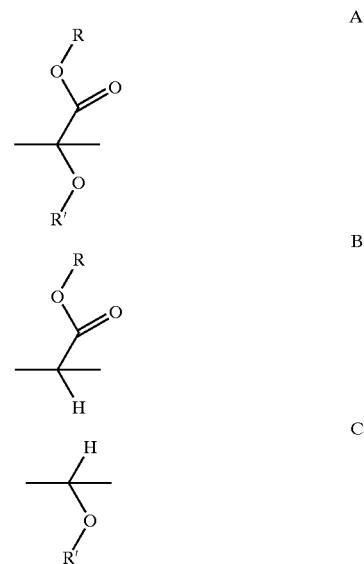

wherein:
R is a member selected from the group consisting of —CH$_3$, —C$_2$H$_5$, -propyl, -iso-propyl, -butyl, -iso-butyl, -sec-butyl, and -tert-butyl; and
R' is a member selected from the group consisting of —C(O)H, —C(O)CH$_3$, and —C(O)C$_2$H$_5$, provided that in the case of more than one R group in a molecule, each R is independently selected from the group consisting of —CH$_3$, C$_2$H$_5$, -propyl, -iso-propyl, -butyl, -iso-butyl, -sec-butyl, and -tert-butyl; and provided that where there is more than one R', each R' is independently selected from the group consisting of —C(O)H, —C(O)CH$_3$, and —C(O)C$_2$H$_5$.

28. A composition according to claim 1, wherein the plasticiser is an ester of one or more acids selected from the group consisting of isocitric acid, tartaric acid, malic acid, lactic acid, glyceric acid and glycolic acid.

29. A composition according and claim 1, wherein the plasticiser is a member selected from the group consisting of: trimethyl trimellitate, diethylene glycol dibenzoate, diethyl malonate, triethyl-O-acetyl citrate, benzylbutyl phthalate, dipropylene glycol dibenzoate, diethyl adipate, tributyl-O-acetyl citrate, dimethyl sebacate, and combinations thereof.

30. A composition according to claim 1, wherein the plasticiser is a member selected from the group consisting of: tributyl-O-acetyl citrate, triethyl-O-acetyl citrate, dipropylene glycol dibenzoate, diethylene glycol dibenzoate and combinations thereof.

31. A composition according to claim 1, wherein the plasticiser component comprises a combination of tributyl-O-acetyl citrate and triethyl-O-acetyl citrate.

32. A composition according to claim 1, wherein the higher cyanoacrylate monomer is present in an amount of at least about 15% by weight based on the combined weight of the lower cyanoacrylate monomer component and the higher cyanoacrylate monomer.

33. A composition according to claim 1, wherein the higher cyanoacrylate momomer is present in an amount within the range from about 15 to about 75% by weight based on the combined weight of the lower cyanoacrylate monomer and the higher cyanoacrylate monomer.

34. A composition according to claim 1, wherein the amount of higher cyanoacrylate monomer is within the range from about 17 to about 70% by weight based on the combined weight of the lower cyanoacrylate monomer and the higher cyanoacrylate monomer.

35. A composition according to claim 1, wherein the amount of higher cyanoacrylate monomer is within the range from about 17 to about 65% by weight based on the combined weight of the lower cyanoacrylate monomer and the higher cyanoacrylate monomer.

36. A composition according to claim 1, wherein the amount of higher cyanoacrylate monomer is within the range from about 17 to about 45% by weight based on the combined weight of the lower cyanoacrylate monomer and the higher cyanoacrylate monomer.

37. A composition according to claim 1, wherein the higher cyanoacrylate monomer is a member selected from the group consisting of n-propyl-cyanoacrylate, iso-propyl cyanoacrylate, n-butyl-cyanoacrylate, sec-butyl-cyanoacrylate, iso-butyl-cyanoacrylate, tert-butyl-cyanoacrylate, n-pentyl-cyanoacrylate, 1-methyl-butyl-cyanoacrylate, 1-ethyl-propyl-cyanoacrylate, neopentyl-cyanoacrylate, n-hexyl-cyanoacrylate, 1-methyl pentyl-cyanoacrylate, n-heptyl-cyanoacrylate, n-octyl-cyanoacrylate, n-nonyl-cyanoacrylate, n-decyl-cyanoacrylate, n-undecyl-cyanoacrylate, n-dodecyl-cyanoacrylate, cyclohexyl-cyanoacrylate, benzyl-cyanoacrylate, phenyl-cyanoacrylate, tetrahydrofurfuryl-cyanoacrylate, allyl cyanoacrylate, propargyl-cyanoacrylate, 2-butenyl-cyanoacrylate, phenethyl-cyanoacrylate, chloropropyl-cyanoacrylate, ethoxyethyl-cyanoacrylate, ethoxypropyl-cyanoacrylate, ethoxy isopropyl-cyanoacrylate, propoxyethyl-cyanoacrylate, iso-propoxyethyl-cyanoacrylate, butoxyethyl-cyanoacrylate, methoxypropyl-cyanoacrylate, methoxy isopropyl-cyanoacrylate, methoxy butyl-cyanoacrylate, propoxymethyl-cyanoacrylate, propoxy ethyl-cyanoacrylate, propoxy propyl-cyanoacrylate, butoxymethyl-cyanoacrylate, butoxyethyl-cyanoacrylate, butoxypropyl-cyanoacrylate, butoxyisopropyl-cyanoacrylate, butoxy butyl-cyanoacrylate and combinations thereof.

38. A composition according to claim 1, wherein the higher cyanoacrylate monomer is a member selected from the group consisting of isopropyl cyanoacrylate, n-butyl cyanoacrylate, sec-butyl cyanoacrylate, n-propyl cyanoacrylate, isobutyl cyanoacrylate, n-hexyl cyanoacrylate, and combinations thereof.

39. A composition according to claim 1, wherein the lower alkyl cyanoacrylate monomer is present in an amount from about 20 to about 70% by weight based on the total weight of the composition.

40. A reaction product formed by curing of a composition according to claim 1.

41. A method of production of a composition according to claim 1 comprising the step of admixing the lower cyanoacrylate component, the higher cyanoacrylate component and the plasticiser component under conditions which do not cure the composition.

42. A process of using a composition according to claim 1 to bond substrates together, comprising the steps of:
providing a first substrate;
applying the composition onto a surface of the first substrate; and
mating a second substrate with the composition-coated first substrate to form a bond therebetween after exposure to conditions appropriate to cure the composition.

43. A process of using a composition according to claim 1 to coat an article, comprising the steps of:
providing a substrate; and
applying the composition over at least a portion of the substrate to form a coating thereon after exposure to conditions appropriate to cure the composition.

44. An assembly formed by applying a composition according to claim 1 to at least a portion of a surface of a substrate and bonding a second substrate thereto by mating the substrates under conditions appropriate to cure the composition.

45. A coated article formed by applying a composition according to claim 1 to at least a portion of a surface of the article to form a coating and exposing the composition to conditions appropriate to cure the composition.

* * * * *

UNITED STATES PATENT AND TRADEMARK OFFICE
CERTIFICATE OF CORRECTION

PATENT NO. : 6,977,278 B1  Page 1 of 1
APPLICATION NO. : 10/023950
DATED : December 20, 2005
INVENTOR(S) : Misiak It is certified that error appears in the above-identified patent and that said Letters Patent is hereby corrected as shown below:

Title page, (30) FOREIGN APPLICATION PRIORITY DATA, insert
--Jan. 16, 2001 (US)..........60/261,185--.

Column 12, line 9, delete "doe" and insert therefor --do--.

Column 19, line 67, delete "see" and insert therefor --seen--.

Column 26, line 51, delete "and" and insert therefor --to--.

Signed and Sealed this

Seventh Day of July, 2009

JOHN DOLL
*Acting Director of the United States Patent and Trademark Office*